(12) United States Patent
Luft et al.

(10) Patent No.: US 9,532,213 B2
(45) Date of Patent: Dec. 27, 2016

(54) LAWFUL INTERCEPTION FOR DEVICE-TO-DEVICE (D2D) COMMUNICATION

(71) Applicant: INTEL IP CORPORATION, Santa Clara, CA (US)

(72) Inventors: Achim Luft, Braunschweig (DE); Muthaiah Venkatachalam, Beaverton, OR (US); Sasha Sirotkin, Petach Tikva (IL); Alexandre S. Stojanovski, Paris (FR)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/125,608

(22) PCT Filed: Sep. 25, 2013

(86) PCT No.: PCT/US2013/061630
§ 371 (c)(1),
(2) Date: Dec. 12, 2013

(87) PCT Pub. No.: WO2014/113083
PCT Pub. Date: Jul. 24, 2014

(65) Prior Publication Data
US 2015/0139087 A1    May 21, 2015

Related U.S. Application Data

(60) Provisional application No. 61/753,914, filed on Jan. 17, 2013.

(51) Int. Cl.
H04W 12/02 (2009.01)
H04W 12/04 (2009.01)
(Continued)

(52) U.S. Cl.
CPC .......... *H04W 12/04* (2013.01); *H04B 7/0417* (2013.01); *H04B 7/0456* (2013.01); *H04J 3/00* (2013.01);
(Continued)

(58) Field of Classification Search
None
See application file for complete search history.

(56) References Cited

U.S. PATENT DOCUMENTS

2004/0203582 A1* 10/2004 Dorenbosch ............ H04L 63/30
455/406
2005/0226193 A1* 10/2005 Karhiniemi ........... H04W 28/24
370/338
(Continued)

FOREIGN PATENT DOCUMENTS

EP         2152032 A1    2/2010
KR   10-2011-0056083 A  5/2011
(Continued)

OTHER PUBLICATIONS

International Search Report and Written Opinion received for PCT Patent Application No. PCT/US2013/061630, mailed on Jan. 13, 2014, 15 pages.
(Continued)

*Primary Examiner* — Chirag Shah
*Assistant Examiner* — Rina Pancholi
(74) *Attorney, Agent, or Firm* — Thorpe North & Western

(57) ABSTRACT

Technology for a lawful interception of a proximity service (e.g., device-to-device (D2D) communication) provided to user equipments (UEs) is disclosed. In an example, a method can include an evolved Node B (eNB) transmitting a proximity service setup message to a first UE to setup D2D communication with a second UE. The eNB can transmit a lawful interception message to the first UE or the second UE (Continued)

to provide lawful interception of the D2D communication. The eNB can receive packets associated with the D2D communication from the first UE or the second UE. The eNB can communicate the received packets from the first UE and the second UE to the core network (CN) to be copied.

20 Claims, 8 Drawing Sheets

(51) Int. Cl.
| | | |
|---|---|---|
| H04L 5/00 | (2006.01) | |
| H04B 7/04 | (2006.01) | |
| H04W 72/02 | (2009.01) | |
| H04L 29/06 | (2006.01) | |
| H04L 29/08 | (2006.01) | |
| H04W 36/22 | (2009.01) | |
| H04W 76/04 | (2009.01) | |
| H04W 16/32 | (2009.01) | |
| H04W 48/16 | (2009.01) | |
| H04W 72/04 | (2009.01) | |
| H04W 56/00 | (2009.01) | |
| H04L 5/22 | (2006.01) | |
| H04J 3/00 | (2006.01) | |
| H04W 74/00 | (2009.01) | |
| H04W 72/12 | (2009.01) | |
| H04W 72/00 | (2009.01) | |
| H04W 28/02 | (2009.01) | |
| H04W 52/02 | (2009.01) | |
| H04W 76/02 | (2009.01) | |
| H04W 48/20 | (2009.01) | |
| H04W 24/02 | (2009.01) | |
| H04W 24/10 | (2009.01) | |
| H04L 1/18 | (2006.01) | |
| H04L 5/14 | (2006.01) | |
| H04L 9/14 | (2006.01) | |
| H04W 8/00 | (2009.01) | |
| H04W 68/02 | (2009.01) | |
| H04W 4/06 | (2009.01) | |
| H04W 48/08 | (2009.01) | |
| H04W 88/06 | (2009.01) | |
| H04W 36/00 | (2009.01) | |
| H04W 84/12 | (2009.01) | |

(52) U.S. Cl.
CPC ........... *H04L 1/1812* (2013.01); *H04L 1/1887* (2013.01); *H04L 5/0051* (2013.01); *H04L 5/0055* (2013.01); *H04L 5/0057* (2013.01); *H04L 5/0062* (2013.01); *H04L 5/14* (2013.01); *H04L 5/1469* (2013.01); *H04L 5/22* (2013.01); *H04L 9/14* (2013.01); *H04L 63/0428* (2013.01); *H04L 63/30* (2013.01); *H04L 65/1006* (2013.01); *H04L 65/4076* (2013.01); *H04L 65/602* (2013.01); *H04L 65/608* (2013.01); *H04L 65/80* (2013.01); *H04L 67/02* (2013.01); *H04W 4/06* (2013.01); *H04W 8/005* (2013.01); *H04W 16/32* (2013.01); *H04W 24/02* (2013.01); *H04W 24/10* (2013.01); *H04W 28/0231* (2013.01); *H04W 36/0066* (2013.01); *H04W 36/22* (2013.01); *H04W 48/08* (2013.01); *H04W 48/16* (2013.01); *H04W 48/20* (2013.01); *H04W 52/0251* (2013.01); *H04W 56/001* (2013.01); *H04W 68/02* (2013.01); *H04W 72/00* (2013.01); *H04W 72/02* (2013.01); *H04W 72/042* (2013.01); *H04W 72/0406* (2013.01); *H04W 72/046* (2013.01); *H04W 72/0413* (2013.01); *H04W 72/12* (2013.01); *H04W 72/1205* (2013.01); *H04W 72/1263* (2013.01); *H04W 72/1278* (2013.01); *H04W 74/00* (2013.01); *H04W 76/021* (2013.01); *H04W 76/023* (2013.01); *H04W 76/046* (2013.01); *H04W 76/048* (2013.01); *H04W 88/06* (2013.01); *H04L 2209/24* (2013.01); *H04L 2209/80* (2013.01); *H04W 84/12* (2013.01)

(56) References Cited

U.S. PATENT DOCUMENTS

| | | | |
|---|---|---|---|
| 2010/0014463 A1* | 1/2010 | Nagai | H04B 7/0695 370/328 |
| 2010/0159877 A1* | 6/2010 | Salkini | H04W 48/04 455/411 |
| 2010/0227610 A1 | 9/2010 | Jabara et al. | |
| 2010/0232503 A1* | 9/2010 | Morimoto | H04W 76/022 375/240.13 |
| 2010/0261469 A1 | 10/2010 | Ribeiro et al. | |
| 2010/0279672 A1* | 11/2010 | Koskela | H04W 36/30 455/418 |
| 2011/0141947 A1* | 6/2011 | Li | H04M 3/2281 370/259 |
| 2011/0280216 A1* | 11/2011 | Li | H04L 12/14 370/331 |
| 2012/0020213 A1* | 1/2012 | Horneman | H04W 76/043 370/231 |
| 2012/0294163 A1 | 11/2012 | Turtinen et al. | |
| 2013/0203380 A1* | 8/2013 | Lin | H04W 12/02 455/410 |
| 2013/0290696 A1* | 10/2013 | Broustis | H04L 9/08 713/150 |
| 2014/0160950 A1* | 6/2014 | Vasudevan | H04W 36/00 370/252 |
| 2015/0223257 A1* | 8/2015 | Wilhelmsson | H04W 76/023 455/452.1 |

FOREIGN PATENT DOCUMENTS

| | | |
|---|---|---|
| KR | 10-2011-0138361 A | 12/2011 |
| WO | WO 2014/067875 A1 | 5/2014 |

OTHER PUBLICATIONS

Fodor et al., "Design Aspects of Network Assisted Device-to-Device Communications", IEEE Communications Magazine, Mar. 2012, pp. 170-177.

International Search Report and Written Opinion received for PCT Patent Application No. PCT/US2013/064756, mailed on Dec. 31, 2013, 11 pages.

3GPP, "3G Security, Lawful Interception, Stage 2", Technical Specification Group Services and System Aspects, 3GPP TS 43.033, V11.0.0, Release 11, Sep. 2012, pp. 1-63.

AQSACOM, "Lawful Interception for 3G and 4G Networks", White Paper, Jan. 2012, 38 pages.

Institute for Information Industry (III), "Proximity aware Service consideration on lawful interception", 3GPP TSG-SA WG1 S1-120068, Feb. 2012, Meeting #57, Agenda 9.7, 3 pages, Kyoto, Japan.

Lei Lei et al, "Operator Controlled Device-to-Device Communications in LTE-Advanced Networks", IEEE Wireless Communications, Jun. 2012, 9 pages.

\* cited by examiner

US 9,532,213 B2

LAWFUL INTERCEPTION FOR DEVICE-TO-DEVICE (D2D) COMMUNICATION

RELATED APPLICATIONS

This application claims the benefit of and hereby incorporates by reference U.S. Provisional Patent Application Ser. No. 61/753,914, filed Jan. 17, 2013.

BACKGROUND

Wireless mobile communication technology uses various standards and protocols to transmit data between a node (e.g., a transmission station or a transceiver node) and a wireless device (e.g., a mobile device or UE). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE) (e.g., Release 11 or V11.3.0), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard (e.g., 802.11ac, 802.11ad), which is commonly known to industry groups as WiFi (Wireless Fidelity).

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

Wireless mobile communication technology can also include device-to-device (D2D) communication where two wireless devices (e.g. UEs) can communicate directly with each other without a node. In some configurations, the wireless devices may include a radio to communicate with the node and a radio to communicate directly with another wireless device. In other configurations, wireless devices with a single radio may also communicate with the node and the other wireless devices at different time intervals or different frequency channels.

D2D communication and communication between a node and a wireless device can use time-division duplexing (TDD) or frequency-division duplexing (FDD) for DL or UL transmissions. Time-division duplexing (TDD) is an application of time-division multiplexing (TDM) to separate downlink and uplink signals (or separate signals to a UE or from the UE in D2D communication). In TDD, downlink signals and uplink signals may be carried on a same carrier frequency (i.e., shared carrier frequency) where the downlink signals use a different time interval from the uplink signals, so the downlink signals and the uplink signals do not generate interference for each other. TDM is a type of digital multiplexing in which two or more bit streams or signals, such as a downlink or uplink, are transferred apparently simultaneously as sub-channels in one communication channel, but are physically transmitted on different resources. In frequency-division duplexing (FDD), an uplink transmission and a downlink transmission (or a transmission to and from a UE in D2D communication) can operate using different frequency carriers (i.e. separate carrier frequency for each transmission direction). In FDD, interference can be avoided because the downlink signals use a different frequency carrier from the uplink signals.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
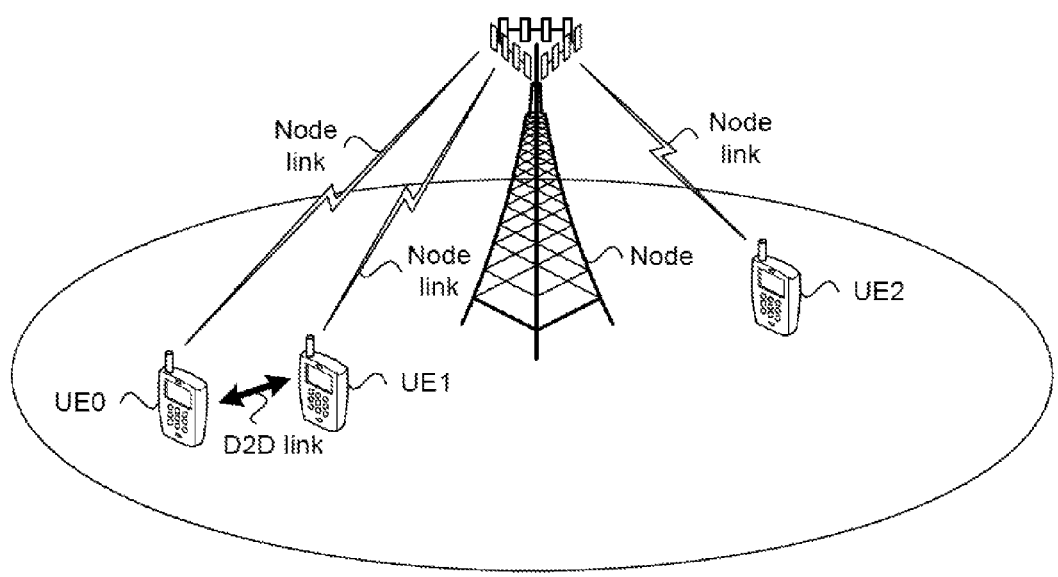
FIG. 1 illustrates a diagram of device-to-device (D2D) communication between wireless devices (e.g., UEs) as an underlay to a cellular network in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

With the proliferation of wireless devices equipped with one or more cellular modem(s), long term evolution (LTE) direct communication can be a feature that can significantly enhance and complement the performance of LTE technology. Furthermore proximity-based applications and proximity services (ProSe) represent an enormous social-technological trend. An LTE direct communication capability, such as device-to-device (D2D) communication, can use LTE protocols for proximity-based applications and services. Additionally, direct device-to-device (D2D) communications can be important to public safety first responders, as well as for offloading a traffic load of cellular network in some cases.

In an example, the D2D communication underlaying a 3GPP LTE-Advanced cellular network can enable local services with limited interference impact on a primary cellular network. FIG. 1 illustrates a user equipment (UE) UE2 communicating via a node link (e.g., uplink and downlink transmissions) with a node and UE0 and UE1 using D2D communication (e.g., D2D link) as an underlay to a cellular network, as well as the node link. Lawful Interception (LI) for non-public safety Proximity Services (e.g., ProSe) scenarios may not be covered by national regulatory protocols.

Lawful interception (LI) can used to obtain communications network data pursuant to lawful authority for the purpose of analysis or evidence. Such lawfully intercepted data can include signaling or network management information or the content of the communications. When the lawfully intercepted data is not obtained in real-time, the data can be referred to as access to retained data (RD).

Lawful interception can be a component of mobile networks in most countries. For example, in the United States, the Federal Communications Commission (FCC) has mandated Communications Assistance for Law Enforcement Act (CALEA) for providing LI. Regulatory authorities or agencies in other countries can also have mandates for LI. A purpose for LI can be that a data and/or Voice over Internet Protocol (VoIP) sessions from a mobile station (MS) or UE can be wiretapped by law enforcement without the knowledge of the UE and/or the user that their data is being tapped.

Figure 2:
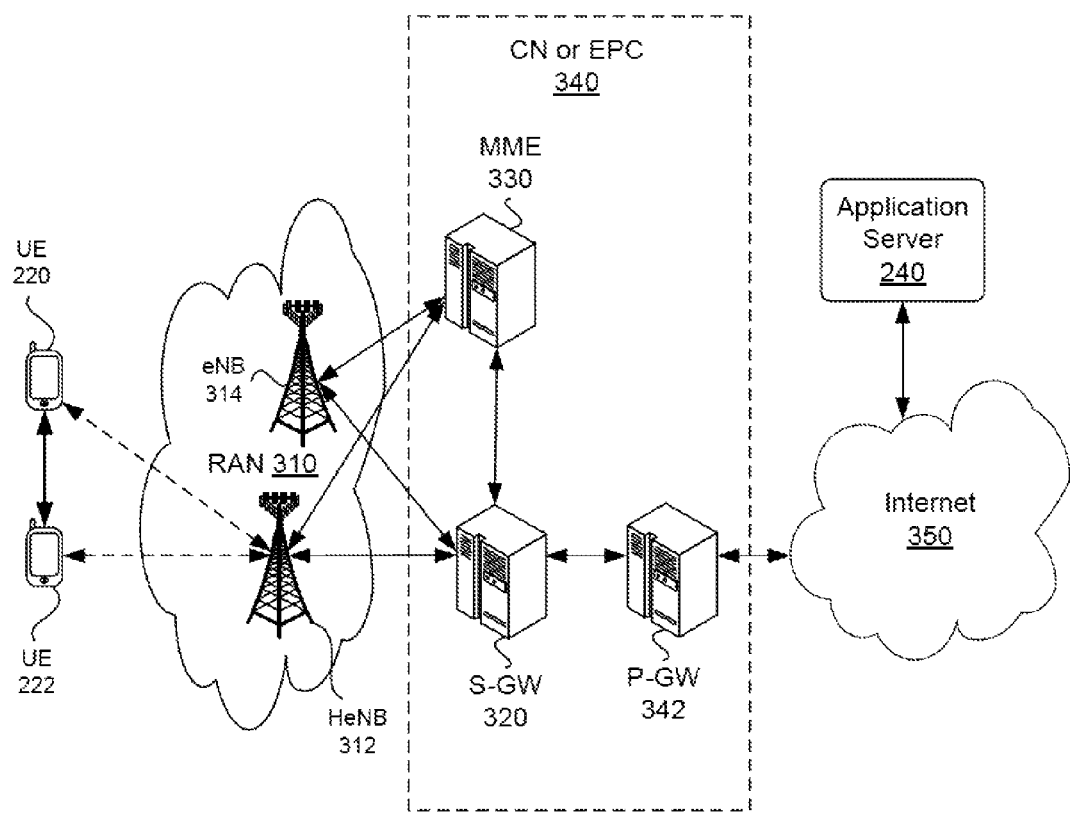
FIG. 2 illustrates a diagram of device- to-device (D2D) communication in a core network (CN) or an evolved packet core (EPC) in accordance with an example.

In a network, the serving gateway (S-GW) 320 can perform replication of the user traffic in case of lawful interception, as illustrated in FIG. 2. Inherently D2D traffic does not pass through the S-GW for LI. FIG. 2 illustrates a 3GPP LTE RAN and evolved packet core (EPC) 340. For example, the RAN 310 can include nodes (e.g., eNB 314 and home eNB (HeNB) 312) in a universal terrestrial radio access network (UTRAN) or an evolved UTRAN (E-UTRAN or eUTRAN). The UEs 220 and 222 can be in D2D wireless communication with each other and in wireless communication with the eNB (e.g., HeNB 312). The RAN can be coupled to the Internet 350 via a core network (CN) (e.g., EPC). The CN or Internet can be coupled to an application server 240. The application server can provide proximity services. The EPC can include S-GW and a mobility management entity (MME) 330 coupled to the RAN, and a packet data network (PDN) gateway (P-GW) 342 to couple the S-GW to a PDN, such as the Internet 350, an intra-net, or other similar network. The S-GW can provide D2D (or peer-to-peer (P2P)) network access and standard network access for the UEs associated with the RAN. The S-GW and MME can be in direct communication with each other via cabling, wire, optical fiber, and/or transmission hardware, such a router or repeater.

A public land mobile network (PLMN) can include a network established and operated by a regulatory body, an administration, or a recognized private operating agency (RPOA) for a specific purpose of providing land mobile communication services to the public. A relationship can exist between each subscriber and the subscriber's home PLMN (HPLMN). If communications are handled over another PLMN, the other PLMN can be referred to as a visited PLMN (VPLMN). A PLMN may provide service in one, or a combination, of frequency bands. A PLMN can be defined by borders of a country. More than one PLMN can exist in a country. The PLMN area can be the geographical area in which a PLMN provides communication services.

The serving gateway (S-GW or SGW) 320 can route and forward user data packets, while acting as a mobility anchor for a user plane during inter-eNodeB handovers and as an anchor for mobility between LTE and other 3GPP technologies (terminating S4 interface and relaying the traffic between 2G/3G systems and PGW). For idle state UEs, the S-GW can terminate the downlink data path and triggers paging when downlink data arrives for the UE. The S-GW can manage and store UE contexts, parameters of the IF bearer service, and network internal routing information. The S-GW can perform replication of the user traffic in case of lawful interception.

An interface can be used when a radio access bearer is established between the wireless device (e.g., UE) and an edge of the 3GPP core network (e.g., gateway general packet radio service (GPRS) support node (GGSN) or packet data network (PDN) gateway (P-GW) 342). The gateway GPRS support node (GGSN) can be a network node that acts as a gateway between a GPRS wireless data network and other networks. The GGSN can store subscriber data received from a home location register (HLR) and/or a serving GPRS support node (SGSN), as well as an address of the SGSN where each wireless device is registered. The PDN gateway (P-GW or PGW) can provide connectivity from the wireless device to external packet data networks by being the point of exit and entry of traffic for the wireless device. A wireless device can have simultaneous connectivity with more than one P-GW for accessing multiple PDNs. The P-GW can perform policy enforcement, packet filtering for each user, charging support, lawful interception and packet screening. The P-GW can act as the anchor for mobility between 3GPP and non-3GPP technologies such as WiMAX and 3GPP2.

The MME 330 can be used to handle the mobility related signaling functionality. In LTE, the MME can be a control node to the RAN. The MME can provide for mobile device idle mode tracking and paging, data retransmissions to the mobile device, mobile device authenticating, inter-core network handover tracking of the mobile device, or combinations of these functions. The MME can be involved in a bearer activation/deactivation process and in choosing the S-GW for the mobile device at the initial attachment and during core network (CN) node relocation. The MME can generate and allocate temporary identities to the mobile devices. The MME can enforce mobile device roaming restrictions. The MME can handle the security key management and lawful interception signaling.

A national regulator can mandate LI, but user traffic using an enabled proximity service may not travel via the Core Network (CN), which usually performs LI. LI can be established and secured by a commercial telecommunication operator. Because D2D traffic may bypass the S-GW, the P-GW, and/or the MME used for LI, different mechanisms to provide LI for D2D traffic and non-public safety Proximity Services (e.g., ProSe) can be used. In an example, D2D communication can be setup and/or controlled by the network or eNB.

Figure 3:
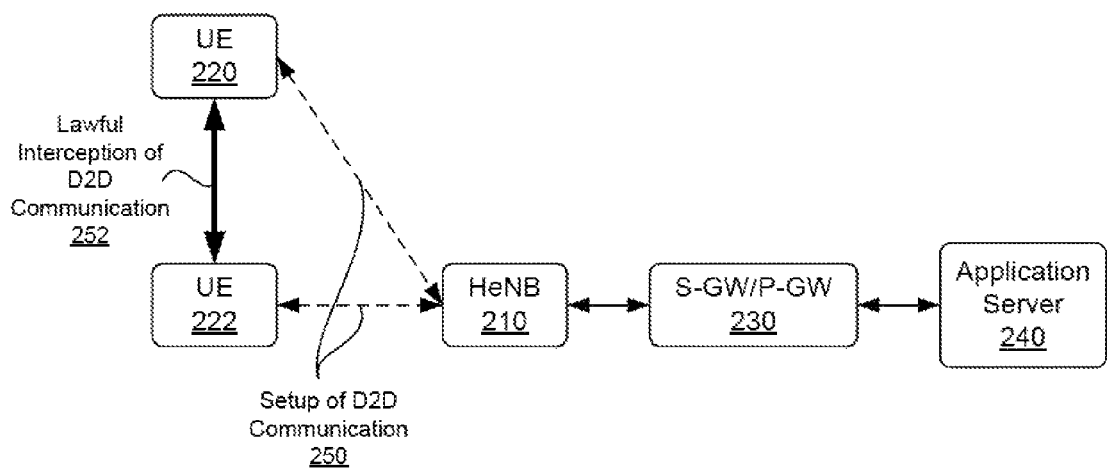
FIG. 3 illustrates a diagram of device-to-device (D2D) communication in a proximity service in accordance with an example.

FIG. 3 provides an illustration of network controlled or assisted device-to-device communication and the D2D communication link targeted for LI 252. The D2D communication for each UE 220 and 222 can be setup 250 and/or controlled by the network via a HeNB 210. In the network, the S-GW and/or the P-GW 230 can provide the LI.

In 3GPP LTE, non-public-safety proximity services can be controlled by the network, where the network, system, or eNB can provide a discovery function in order to notify users (e.g., UEs) that other users are in proximity and can also assist two or more UEs in proximity to establish a direct device-to-device (D2D) communication link, as illustrated in FIG. 3.

Proximity services (e.g., ProSe) can be divided into scenarios for public safety (e.g., critical communication) and commercial scenarios (e.g., non-public-safety communication). LI can apply to public safety or commercial scenarios. LI can apply to ProSe traffic since the D2D traffic is a communication service offered by a public operator. A general purpose for lawful interception is that a user does not have means to detect that they are subject of LI.

To provide lawful interception, additional signaling can be used to notify an application server 240 (e.g., a ProSe application server) that a user is under LI. As a result of such signaling the ProSe application or system can use various mechanisms to provide LI.

Figure 4:
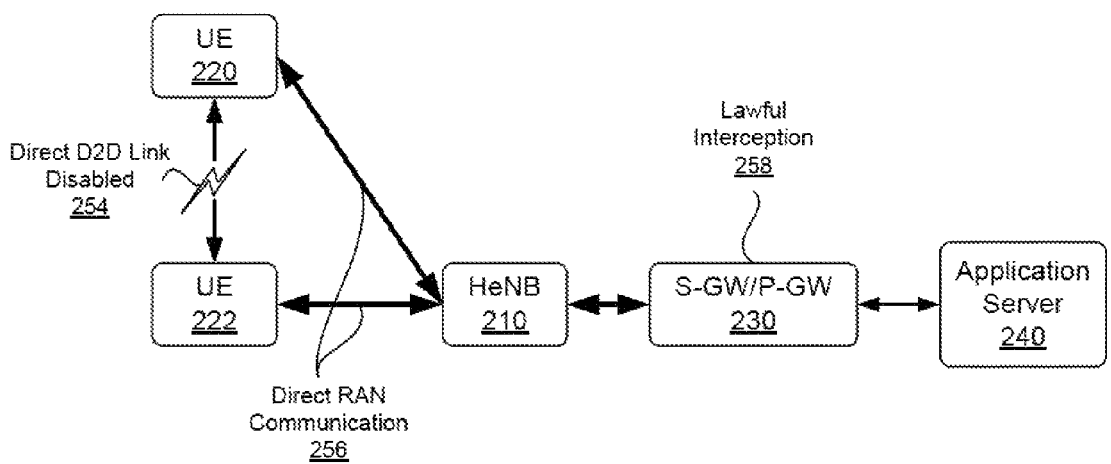
FIG. 4 illustrates a diagram of disabling device-to-device (D2D) link for lawful interception in accordance with an example.

For example, the ProSe application can disable the UE that is subject to be under lawful interception or other UEs in proximity of the UE that is subject to be under lawful interception for the ProSe communication, as illustrated by FIG. 4. For instance, the proximity service does not allow the UE subject to LI to be discoverable or disables the direct D2D communication of the UE.

Figure 5:
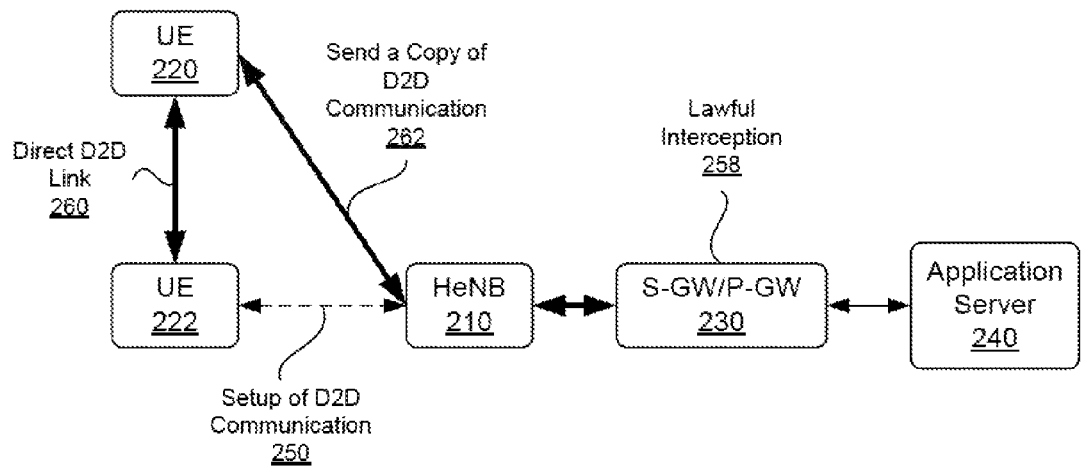
FIG. 5 illustrates a diagram of copying messages of device-to-device (D2D) communication for lawful interception in accordance with an example.

In another example, the ProSe application can notify the UE that is subject to be under lawful interception or other UEs in direct communication with the UE that is subject to be under lawful interception to send a copy of the D2D user traffic to the network where the D2D user traffic can be easily intercepted, as illustrated by FIG. 5. The copy of the D2D user traffic can include packets that are sent and received via direct communication.

Figure 6:
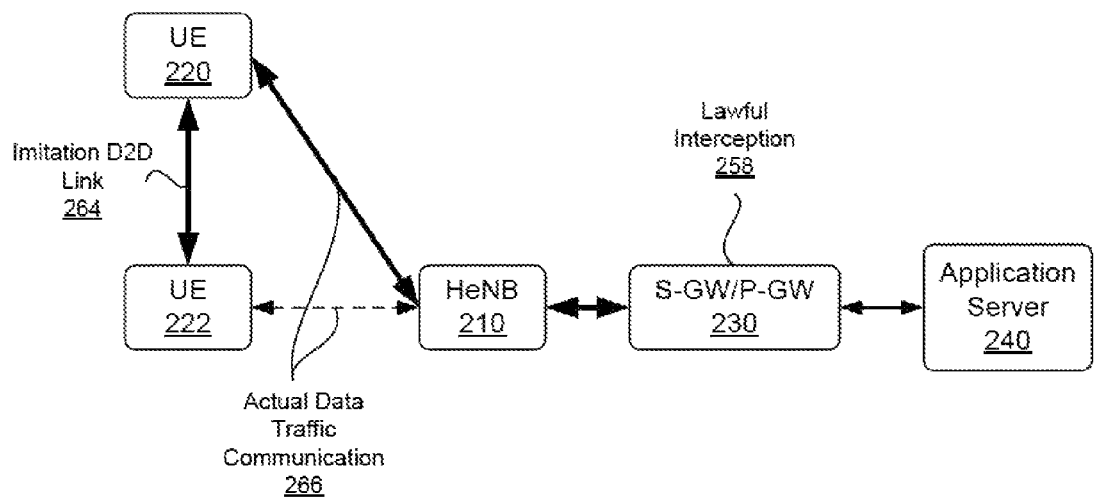
FIG. 6 illustrates a diagram of generating an imitation device-to-device (D2D) link for lawful interception in accordance with an example.

In another example, the ProSe application can establish a fake device-to-device communication link that is actually routed via the network, where the communication can easily be intercepted (per typical network LI protocols), as illustrated in FIG. 6.

Depending on several parameters like the distance of the UEs, the Quality of Service (QoS) of the communication between the UEs, operator's policy, user's policy, or regulatory requirements, the communication of users in proximity to each other can be routed via the network (e.g., eNB) or via direct communication (e.g., UE). Referring back to FIG. 4, the proximity service disables a direct D2D link 254, so a direct link communication is not established. As a result, the communication can be re-routed via the network infrastructure, so the UEs use direct RAN communication 256, which can be lawfully intercepted 258 by the CN (e.g., the S-GW and/or the P-GW). In an example, when the proximity service fails to establish a direct D2D link, a user may become aware that they are subject to LI because a direct link may normally be established under similar circumstances, which can be a drawback of disabling the D2D link. For instance, when users are very close to each other, the proximity service can normally setup and/or manage the D2D link. In an example, the user may be aware that D2D link has been established and D2D communication is being performed. In such a setting, proximity services may be misused as measurement to detect whether a UE is subject to LI or not. In an example, the proximity service can generate a Prose-setup-denied-message when the D2D link is disabled with a reason other than LI, such as "D2D communication not possible, because a low QoS." In order to evade LI detection, the proximity service can generate a reason (other than the actual reason) based on the scenario, why D2D communication may not be established or has to be terminated. Providing seamless service continuity between communication via direct mode and via network infrastructure can offer a countermeasure to detection of a disabled D2D link and allow interception of ongoing direct device-to-device communication. In addition, service continuity can lead to a better user experience and can be triggered by different events (e.g., QoS below a threshold). LI can be just another additional trigger to maintain service continuity with re-routing the traffic via network infrastructure.

Referring back to FIG. 5, the proximity service can request that the UE sends a copy of the user data sent via direct. D2D link 260. The copy can be sent in real time (e.g., as the traffic occurs on the direct link) or direct link traffic be cached and sent later (e.g., in compressed data packets). Sending copies of the D2D communication 262 may be difficult for a user under LI to detect because the communication between UEs actually occurs via the D2D link. Copying the D2D communication can perform additional interception operations on the UE, which are not part of the normal communication, which can result in additional calculations and transmitting activities. To perform the additional interception operations, an entity (or agent) in hardware (HW), firmware (FW), or software (SW) in the UE can perform the data duplication.

Referring back to FIG. 6, the proximity service can setup an imitation D2D link 264 (i.e., a fake direct link, an artificial D2D link, or a simulated D2D link) while the actual data traffic communication 266 is still routed via the network where the data and packets can be intercepted. So from the perspective of the UE, the network communication can appear to be proximity service communication. For example, a user can be charged for some network communication, while proximity service communication can be free of charge. With LI, the network communication may be free of charge, or the user can be notified that the proximity service is being used. Using an imitation link can provide LI without meaningful additional effort or signaling (e.g., calculation power or data duplication), as used for copying direct link traffic. The imitation link can better evade detection of LI over just disabling the D2D link. Using the imitation link may be difficult to detect by a user under LI because no additional agents may be used and the D2D link appears to be functioning. In an example, the imitation link can still provide some minimal status signaling via the D2D link. Seamless service continuity can be beneficial in smoothly setting up the imitation device-to-device communication or other methods, such as copying D2D messages and disabling the D2D link.

Figure 7:
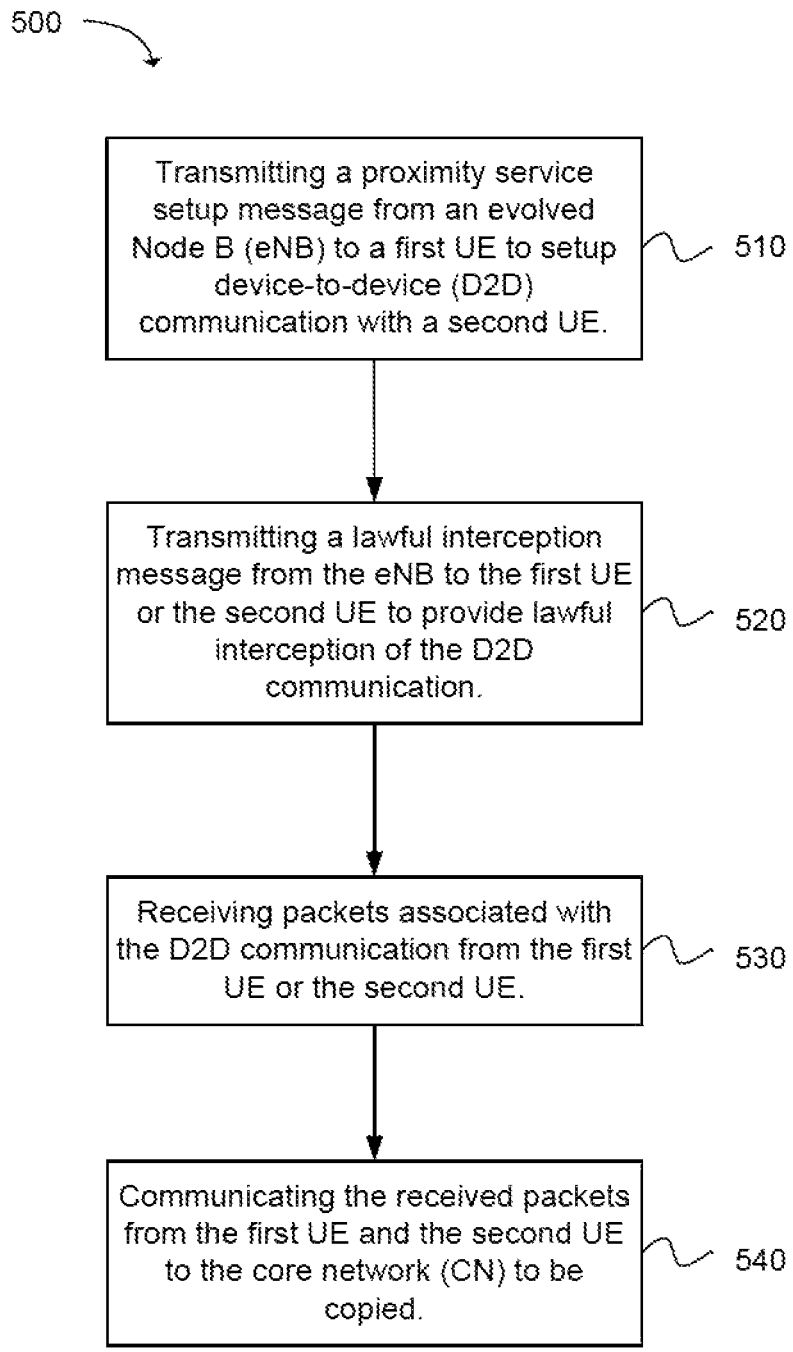
FIG. 7 depicts a flow chart of a method for a lawful interception of a proximity service provided to user equipments (UEs) in accordance with an example.

Another example provides a method 500 for a lawful interception of a proximity service provided to user equipments (UEs), as shown in the flow chart in FIG. 7. The method may be executed as instructions on a machine or computer circuitry, where the instructions are included on at least one computer readable medium or one non-transitory machine readable storage medium. The method includes the operation of transmitting a proximity service setup message from an evolved Node B (eNB) to a first UE to setup D2D communication with a second UE, as in block 510. The operation of transmitting a lawful interception message from the eNB to the first UE or the second UE to provide lawful interception of the D2D communication follows, as in block 520. The next operation of the method can be receiving packets associated with the D2D communication from the first UE or the second UE, as in block 530. The method can further include communicating the received packets from the first UE and the second UE to the core network (CN) to be copied, as in block 540.

In an example, the operation of communicating a lawful interception message can further include instructing the first UE or the second UE to generate an artificial D2D link between the first UE and the second UE. Communication between the first UE and the second UE can pass through the eNB. The method can further include communicating a message to the CN to disable charges for communication associated with the artificial D2D link passing through the eNB even when charges for direct communication with the eNB apply.

In another example, the operation of communicating a lawful interception message can further include instructing the first UE or the second UE to copy packets from the D2D communication between the first UE and the second UE. The operation of receiving packets associated with the D2D communication can further include receiving copied packets from the D2D communication from the first UE or the second UE.

In another configuration, the operation of communicating a lawful interception message can further include instructing the first UE or the second UE via a proximity service setup denied message to disable the D2D communication between the first UE and the second UE. The communication between the first UE and the second UE can pass through the eNB.

Figure 8:
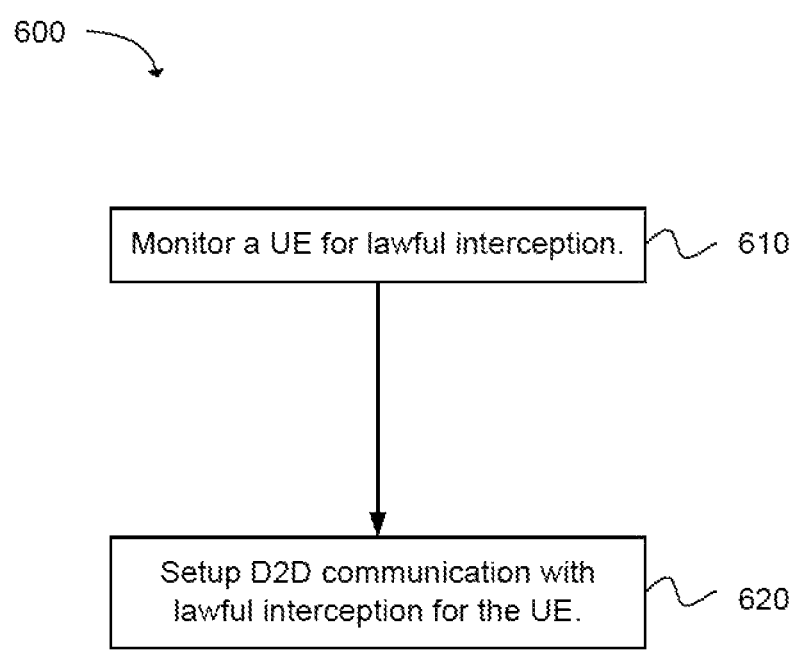
FIG. 8 depicts functionality of computer circuitry of a node operable for lawful interception of device-to-device (D2D) communication of user equipments (UEs) in accordance with an example.

Another example provides functionality 600 of computer circuitry of a node operable for lawful interception of device-to-device (D2D) communication of user equipments (UEs), as shown in the flow chart in FIG. 8. The functionality may be implemented as a method or the functionality may be executed as instructions on a machine, where the instructions are included on at least one computer readable medium or one non-transitory machine readable storage medium. The computer circuitry can be configured to monitor a UE for lawful interception, as in block 610. The computer circuitry can be further configured to setup D2D communication with lawful interception for the UE, as in block 620.

In an example, the computer circuitry configured to setup the D2D communication with lawful interception for the UE can be further configured to: Generate an imitation D2D link between the UE and another UE; exchange data between the UE and the other UE via the node instead using the imitation D2D link; and communicate the exchanged data between the UE and the other UE to the core network (CN) to be copied. The data can appear to the UE and the other UE to be transferred using the imitation D2D link.

In another example, the computer circuitry configured to setup the D2D communication with lawful interception for the UE can be further configured to: Generate a D2D link between the UE and the other UE; request the UE or the other UE to copy data transmitted via the D2D link; receive copied D2D data from the UE or the other UE; and communicate the copied D2D data to the core network (CN). In an example, the computer circuitry configured to generate a D2D link between the UE can be further configured to establish a D2D link between the UE and the other UE when the UE and the other UE are within a specified transmission range based on channel quality indicator (CQI) feedback.

In a configuration, the computer circuitry configured to setup the D2D communication with lawful interception for the UE can be further configured to: Disable a direct D2D link between the UE and the other UE; exchange data between the UE and the other UE via the node instead of the disabled D2D link; and communicate the exchanged data between the UE and the other UE to the core network (CN) to be copied.

In another example, the D2D communication can include a non-public-safety proximity service controlled by the core network (CN) (e.g., an evolved packet core (EPC)) via an evolved Node B (eNB). The ON or EPC can include a packet data network (PDN) gateway (P-GW) and a serving gateway (S-GW) configured for lawful interception.

Figure 9:
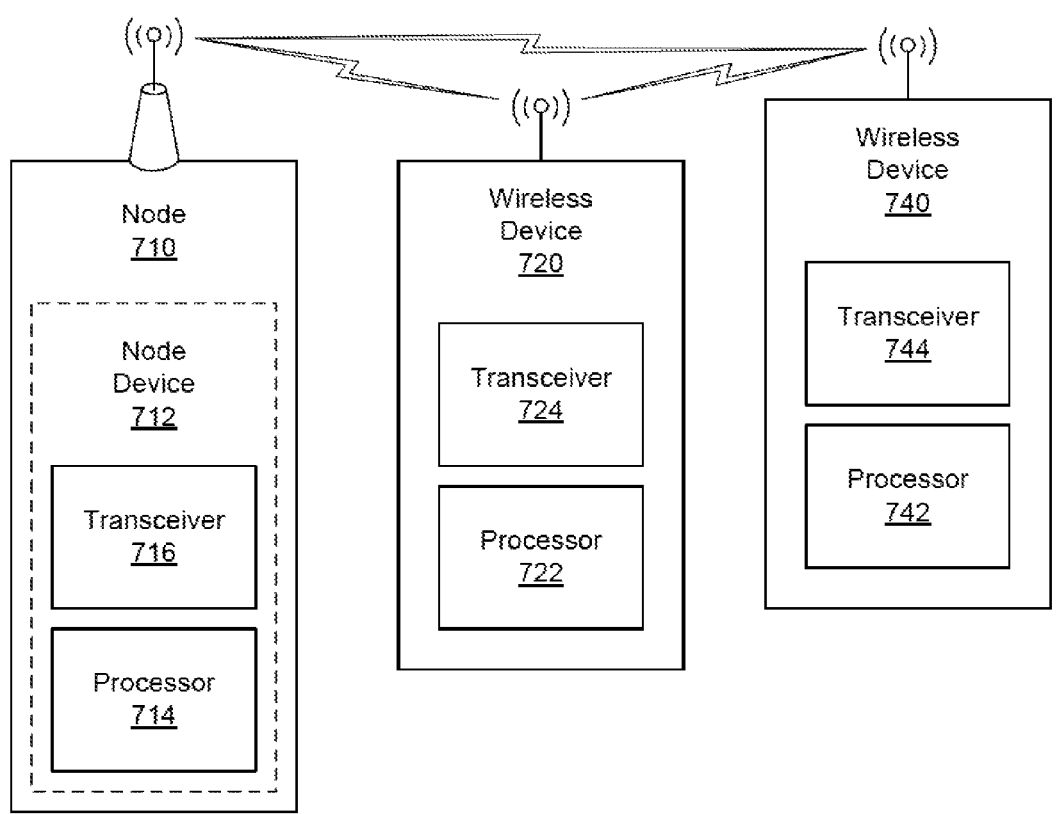
FIG. 9 illustrates a block diagram of a node (e.g., eNB), a wireless device (e.g., UE), and a proximity wireless device (e.g., proximity UE) in accordance with an example.

FIG. 9 illustrates an example node 710 (e.g., eNB) and an example wireless device 720 (e.g., UE) and an example proximity wireless device 740 (e.g., proximity UE) in proximity to the wireless device. The node can include a node device 712. The node device or the node can be configured to communicate with the wireless device and the proximity wireless device. The node can be operable for lawful interception of device-to-device (D2D) communication of user equipments (UEs). The node device can include a processor 714 and a transceiver 716. The processor 714 and/or transceiver 716 can be operable for lawful interception of device-to-device (D2D) communication of user equipments (UEs), as described in 600 of FIG. 8. The node 710 can include a base station (BS), a Node B (NB), an evolved Node B (eNB), a baseband unit (BBU), a remote radio head (RRH), a remote radio equipment (RRE), a remote radio unit (RRU), or a central processing module (CPM).

The wireless device 720 and proximity wireless device 740 can include a transceiver 724 and 744 and a processor 722 and 742. The wireless device can be configured to communicate directly with the proximity wireless device via D2D communication protocols. The processor 722 and 742 and/or transceiver 724 and 744 can be configured for a lawful interception of a proximity service provided to user equipments (UEs), as described in 500 of FIG. 7.

Referring back to FIG. 9, the UE 720 or 740 can be operable for lawful interception of device-to-device (D2D) communication. The transceiver 724 and 744 can be configured to: Receive a D2D setup message from an evolved Node B (eNB) to setup D2D communication with another UE, and receive a lawful interception message from the eNB to provide lawful interception of the D2D communication. The processor 722 and 742 can be configured to setup the D2D communication with lawful interception for the UE.

In another configuration, the processor 722 and 742 can be further configured to create a simulated D2D link with the other UE, and the transceiver 724 and 744 can be further configured to send the D2D communication to the other UE via the eNB instead of the simulated D2D link. The D2D communication can appear to the UE to use the simulated D2D link.

In another example, the processor 722 and 742 can be further configured to create a D2D link with the other UE, and the transceiver 724 and 744 can be further configured to:

communicate with the other UE using the D2D link; and send a copy of the D2D communication with the other UE to the eNB. The UE can include a lawful interception agent (e.g., hardware, firmware, or software) to monitor the D2D communication and copy data of the D2D communication to be sent to the eNB. In another configuration, the copy of the D2D communication can be sent per packet in real-time or in a batch format at a subsequent time from the D2D communication.

In another configuration, the processor 722 and 742 can be further configured to disable a direct D2D link with the other UE, and the transceiver 724 and 744 can be further configured to communicate with the other UE via the eNB. The processor can be further configured to generate a low quality of service (QoS) message to a user when the direct D2D link is disabled. In another example, the D2D communication can be a proximity service controlled by the core network (CN) via an evolved Node B (eNB), and the CN can include a packet data network (PDN) gateway (P-GW) and a serving gateway (S-GW) configured for lawful interception.

Figure 10:
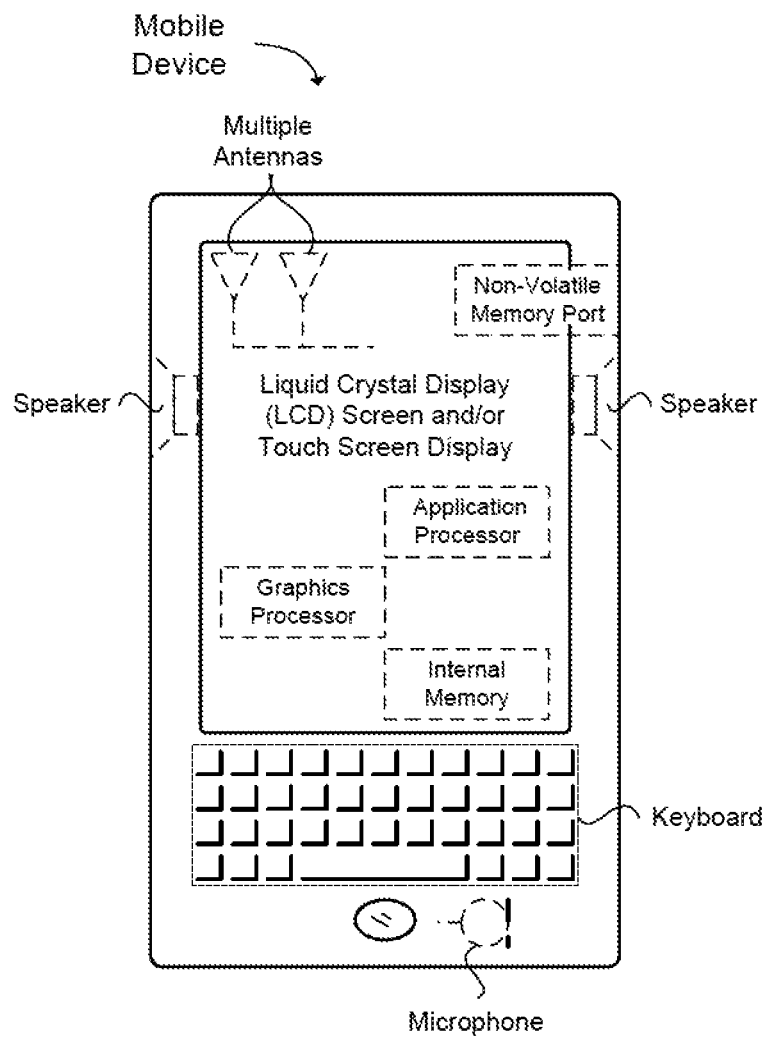
FIG. 10 illustrates a diagram of a wireless device (e.g., UE) in accordance with an example.

FIG. 10 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 10 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention.

Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for a lawful interception of a proximity service provided to user equipments (UEs), comprising:
transmitting a proximity service setup message from an evolved Node B (eNB) to a first UE to setup device-to-device (D2D) communication with a second UE;
transmitting a lawful interception message from the eNB to the first UE or the second UE to provide lawful interception of the D2D communication;
receiving packets associated with the D2D communication from the first UE or the second UE;
communicating the received packets from the first UE and the second UE to a core network (CN) to be copied;
instructing the first UE or the second UE to generate an artificial D2D link between the first UE and the second UE, wherein the D2D communication appears to the either the first UE or to the second UE to use the artificial D2D link and the artificial D2D link provides status signaling, wherein communication between the first UE and the second UE passes through the eNB; and
communicating a message to the CN to disable charges for communication associated with the artificial D2D link passing through the eNB even when charges for direct communication with the eNB apply.

2. The method of claim 1, wherein:
transmitting a lawful interception message further comprises:
instructing the first UE or the second UE to copy packets from the D2D communication between the first UE and the second UE; and
receiving packets further comprises:
receiving copied packets from the D2D communication from the first UE or the second UE.

3. The method of claim 1, wherein:
transmitting a lawful interception message further comprises:
instructing the first UE or the second UE via a proximity service setup denied message to disable the D2D communication between the first UE and the second UE, wherein communication between the first UE and the second UE passes through the eNB.

4. At least one non-transitory machine readable storage medium comprising a plurality of instructions that when executed implement the method of claim 1.

5. A node operable for lawful interception of device-to-device (D2D) communication of user equipments (UEs), the node comprising one or more processors and memory configured to:
monitor a UE for lawful interception;
generate a D2D link between the UE and another UE;
setup D2D communication with lawful interception for the UE;
generate an imitation D2D link between the UE and the another UE, wherein the D2D communication appears to the UE to use the imitation D2D link and the imitation D2D link provides status signaling, wherein communication between the UE and the another UE passes through an evolved Node B (eNB); and
communicating a message to a core network (CN) to disable charges for communication associated with the imitation D2D link passing through the eNB even when charges for direct communication with the eNB apply.

6. The node of claim 5, wherein the one or more processors and memory are further configured to setup the D2D communication with lawful interception for the UE is further configured to:
exchange data between the UE and the another UE via the node instead using the imitation D2D link, wherein the data appears to the UE and the another UE to be transferred using the imitation D2D link; and
communicate the exchanged data between the UE and the another UE to the CN to be copied.

7. The node of claim 5, wherein the one or more processors and memory are further configured to setup the D2D communication with lawful interception for the UE is further configured to:
request the UE or the another UE to copy data transmitted via the D2D link;
receive copied D2D data from the UE or the another UE; and
communicate the copied D2D data to the CN.

8. The node of claim 7, wherein the one or more processors and memory are further configured to generate the D2D link between the UE and the another UE is further configured to:
establish a D2D link between the UE and the another UE when the UE and the another UE are within a specified transmission range based on channel quality indicator (CQI) feedback.

9. The node of claim 5, wherein the one or more processors and memory are further configured to setup the D2D communication with lawful interception for the UE is further configured to:
disable a direct D2D link between the UE and the another UE;
exchange data between the UE and the another UE via the node instead of the disabled D2D link; and
communicate the exchanged data between the UE and the another UE to the CN to be copied.

10. The node of claim 5, wherein the D2D communication is a non-public-safety proximity service controlled by the CN via an evolved Node B (eNB), and the CN includes a packet data network (PDN) gateway (P-GW) and a serving gateway (S-GW) configured for lawful interception.

11. The node of claim 5, wherein the UE includes an antenna, a touch sensitive display screen, a speaker, a microphone, a graphics processor, an application processor, internal memory, or a non-volatile memory port, and the node includes a base station (BS), a Node B (NB), an evolved Node B (eNB), a baseband unit (BBU), a remote radio head (RRH), a remote radio equipment (RRE), a remote radio unit (RRU), or a central processing module (CPM).

12. A user equipment (UE) for lawful interception of device-to-device (D2D) communication, comprising:
a transceiver to:
receive a D2D setup message from an evolved Node B (eNB) to setup the D2D communication with another UE, and
receive a lawful interception message from the eNB to provide lawful interception of the D2D communication; and
a processor to:
setup the D2D communication with lawful interception for the UE;
disable a direct D2D link with another UE; and
create a simulated D2D link with the another UE, wherein the D2D communication appears to the UE to use the simulated D2D link and the simulated D2D link provides status signaling, wherein communication between the UE and the another UE passes through the eNB; and
process, for transmitting to a core network (CN), a message to disable charges for communication associated with the simulated D2D link passing through the eNB even when charges for direct communication with the eNB apply.

13. The UE of claim 12, wherein:
the transceiver is further configured to:
send the D2D communication to the another UE via the eNB instead of the simulated D2D link, wherein the D2D communication appears to the UE to use the simulated D2D link.

14. The UE of claim 12, wherein:
the processor is further configured to:
create the D2D link with the another UE, and
the transceiver is further configured to:
communicate with the another UE using the D2D link; and
send a copy of the D2D communication with the another UE to the eNB.

15. The UE of claim 14, further comprising:
a lawful interception agent to monitor the D2D communication and copy data of the D2D communication to be sent to the eNB.

16. The UE of claim 14, wherein the copy of the D2D communication is sent per packet in real-time or in a batch format at a subsequent time from the D2D communication.

17. The UE of claim 12, wherein:
the processor is further configured to:
disable a direct D2D link with the another UE, and
the transceiver is further configured to:
communicate with the another UE via the eNB.

18. The UE of claim 17, wherein:
the processor is further configured to:
generate a low quality of service (QoS) message to a user when the direct D2D link is disabled.

19. The UE of claim 12, wherein the D2D communication is a proximity service controlled by a core network (CN) via an evolved Node B (eNB), and the CN includes a packet data network (PDN) gateway (P-GW) and a serving gateway (S-GW) configured for lawful interception.

20. The UE of claim 12, wherein the UE includes an antenna, a touch sensitive display screen, a speaker, a microphone, a graphics processor, an application processor, internal memory, or a non-volatile memory port.

* * * * *